US006354788B1

(12) United States Patent
Adams

(10) Patent No.: US 6,354,788 B1
(45) Date of Patent: Mar. 12, 2002

(54) DUMP TRUCK WITH MOVABLY ATTACHABLE RAMP ASSEMBLY

(76) Inventor: James A. Adams, 29 Linda Dr., Hartwell, GA (US) 30643

( * ) Notice: Subject to any disclaimer, the term of this patent is extended or adjusted under 35 U.S.C. 154(b) by 0 days.

(21) Appl. No.: 09/560,476

(22) Filed: Apr. 28, 2000

(51) Int. Cl.$^7$ .............................. B60P 1/00; B60P 1/04; B62D 25/00; B62D 33/00
(52) U.S. Cl. ................... 414/537; 296/56; 298/23 MD
(58) Field of Search ...................... 296/56; 298/23 MD; 414/480, 537

(56) References Cited

U.S. PATENT DOCUMENTS

| 2,683,545 A | * | 7/1954 | Wood ........................ 214/501 |
| 3,905,493 A | * | 9/1975 | Logue ...................... 214/75 T |
| 4,088,235 A | * | 5/1978 | Thacker ...................... 214/85 |
| 4,993,908 A | * | 2/1991 | Park ........................... 414/472 |
| 5,393,115 A | | 2/1995 | Hamilton ..................... 296/52 |
| 5,407,251 A | * | 4/1995 | Ritchie, II et al. ..... 298/23 MD |
| 5,882,085 A | | 3/1999 | Pekarek ...................... 298/1 A |
| 5,890,867 A | | 4/1999 | Hagemeyer ................. 414/519 |
| 5,907,276 A | | 5/1999 | Lance ..................... 340/425.5 |
| 5,938,397 A | * | 8/1999 | Schouest .................... 414/537 |

FOREIGN PATENT DOCUMENTS

JP  58-218437  * 12/1983

* cited by examiner

Primary Examiner—Christopher P. Ellis
Assistant Examiner—Kenneth W Bower
(74) Attorney, Agent, or Firm—Womble Carlyle Sandridge & Rice, PLL

(57) ABSTRACT

The present invention relates to a landscape truck which hauls equipment in the usual way yet doubles as a dump truck for hauling and dumping landscaping supplies. The truck has a conventional frame and drive train and includes a cab, a truck bed mounted to the frame behind the cab and raisable to a dumping position, and a ramp assembly movably attachable to the rear end of the bed. The ramp assembly is selectively moveable between a lowered position, wherein the ramp extends from the truck bed downwardly to the ground to allow equipment to be driven onto the back of the truck, and a raised position wherein the ramp assembly is raised to a position above the bed of the truck to allow the truck bed to be raised to its dumping position.

25 Claims, 3 Drawing Sheets

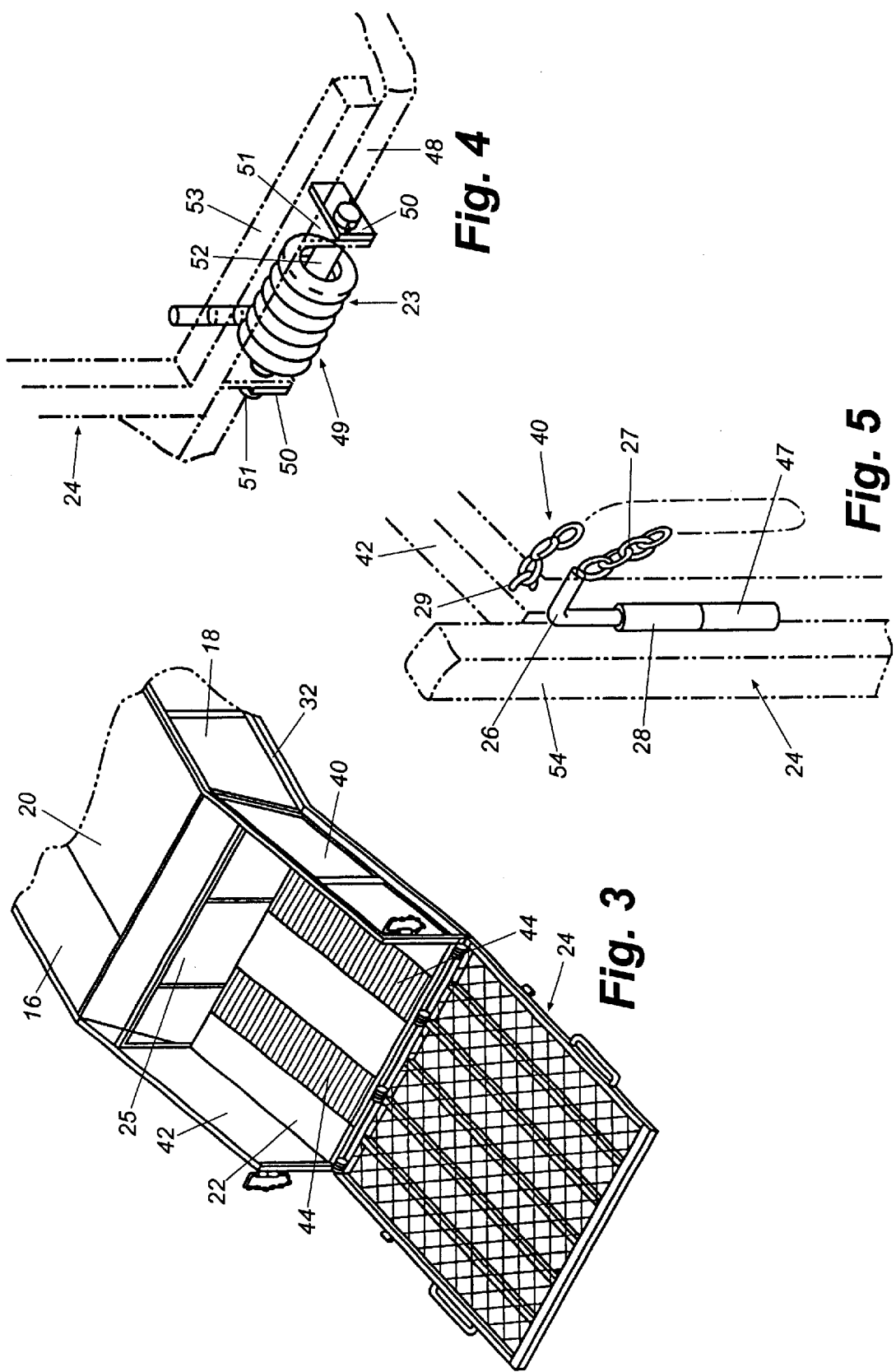

DUMP TRUCK WITH MOVABLY ATTACHABLE RAMP ASSEMBLY

FIELD OF THE INVENTION

The present invention relates generally to commercial trucks and more specifically to landscape trucks used by landscaping professionals to haul equipment and supplies.

BACKGROUND

Landscape professionals have long used specialized trucks to haul equipment such as mowers, blowers, hand tools, and the like to a job site. These trucks, known as landscape trucks, generally are provided with a shallow flat bed sized to hold the equipment and a ramp system for driving or otherwise loading equipment into the bed. In one common design, the ramp system includes a rear extension of the bed that slopes downwardly toward and extends partially to the ground. A tailgate usually is hingedly mounted to the back edge of the rear extension. The tailgate can be swung on its hinges between a stowed position, wherein the gate extends upwardly for preventing equipment from falling out of the bed, and a deployed position wherein the gate extends from the back edge of the rear extension to the ground. When the gate is in its deployed position, the gate and the rear extension together form a ramp extending from the ground to the bed of the landscape truck. Mowers and other equipment can then be driven or pushed up the ramp into the bed, whereupon the gate is raised to its stowed position for transportation.

Landscaping professionals also have frequent need to deliver landscaping supplies such as fill dirt, mulch, topsoil, gravel, stones, bricks, and the like to a job site. When such a need arises, it is commonly necessary that a separate dump truck be commissioned for hauling the supplies to the job site and dumping it on the ground. Unfortunately, the landscape truck used to haul equipment generally is not suitable for hauling and dumping dirt and other supplies because the bed of the truck cannot be raised to dump the supplies. Even if the landscape truck was equipped with a bed raising mechanism, actual raising of the bed still would be precluded because the rear extension would quickly impact the ground. Thus, landscape professionals historically have used both a landscape truck and a dump truck when equipment and supplies must be delivered to a job. The necessity of using different types of trucks to haul different loads obviously results in increased costs of operation in the form of increased insurance, maintenance, fuel, and operation costs. Further, additional personnel are oftentimes required to operate two or more trucks, which increases payroll and related costs.

Thus, a need exists for a truck that can be used by landscape professionals to haul equipment to a job site in the customary manner and also to haul and easily dispense landscaping supplies such as dirt, mulch, gravel, and the like. Such a truck should include an easy-to-use ramp assembly for driving equipment onto the bed of the truck and, should also include a raiseable bed for dumping dirt and other supplies onto the ground. It is to the provision of such a truck that the present invention is primarily directed.

SUMMARY OF THE INVENTION

Briefly described, the present invention, in one preferred embodiment thereof, comprises an improved landscape truck that hauls equipment in the usual way and that doubles as a dump truck for hauling and dumping landscaping supplies. The truck includes a cab, behind which a truck bed is mounted. The bed has a floor, sidewalls, and a front wall and a hydraulic lifting assembly is provided for selectively raising the bed to a dumping position. An articulateable ramp assembly is mounted on pivot arms to the rear end portion of the bed. The ramp assembly includes a deck and a tailgate hingedly mounted to the back edge of the deck. The ramp assembly can be pivoted on its pivot arms by hydraulic cylinders between a lowered position, wherein the ramp assembly extends rearwardly from the bed in much the same configuration as in a standard landscape truck, and a raised position wherein the ramp assembly is positioned over the bed of the truck displaced from the rear end thereof. When the ramp assembly is in its lowered position, the deck of the assembly preferably slopes downwardly from the rear end of the truck bed and the tailgate can be deployed to form a ramp for driving equipment onto the bed. When the ramp assembly is in its raised position displaced from the rear end of the bed, the bed of the truck may be raised to dump its contents without the ramp assembly engaging the ground or otherwise being in the way.

Accordingly, an improved landscape truck is now provided that serves both the functions of a traditional landscape truck and a dump truck. The landscape professional may use the truck to haul equipment and also may use it to haul and dump dirt and other landscaping supplies at the job site. The requirement that two separate trucks be employed is therefore eliminated, as is the trouble and added expense of using two trucks. Indeed, the landscape professional may load the truck first with dirt or other supplies and then drive equipment onto the bed of the truck behind the dirt. At the job site, the ramp assembly is deployed for unloading the equipment from the bed, whereupon the ramp assembly can be moved to its raised position and the bed raised to dump the dirt on the ground. These and other features, objects, and advantages of this invention will become more apparent upon review of the detailed description set forth below when taken in conjunction with the accompanying drawing figures, which are briefly described as follows.

BRIEF DESCRIPTION OF THE DRAWINGS

A full and enabling disclosure of the present invention, including the best mode known to the inventor of carrying out the invention is set forth more particularly in the remainder of the specification, including reference to the accompanying drawings wherein:

FIG. 3 is a perspective showing the ramp assembly with its tailgate deployed to form a ramp for loading equipment onto the bed of the truck.

FIG. 4 is a perspective partially phantomed view illustrating the hinged spring-loaded attachment of the tailgate to the back edge of the rear extension of the ramp assembly.

FIG. 5 is a perspective partially phantomed view illustrating a preferred latching mechanism for latching the tailgate in its raised position.

DETAILED DESCRIPTION OF THE PREFERRED EMBODIMENTS

Figure 1:
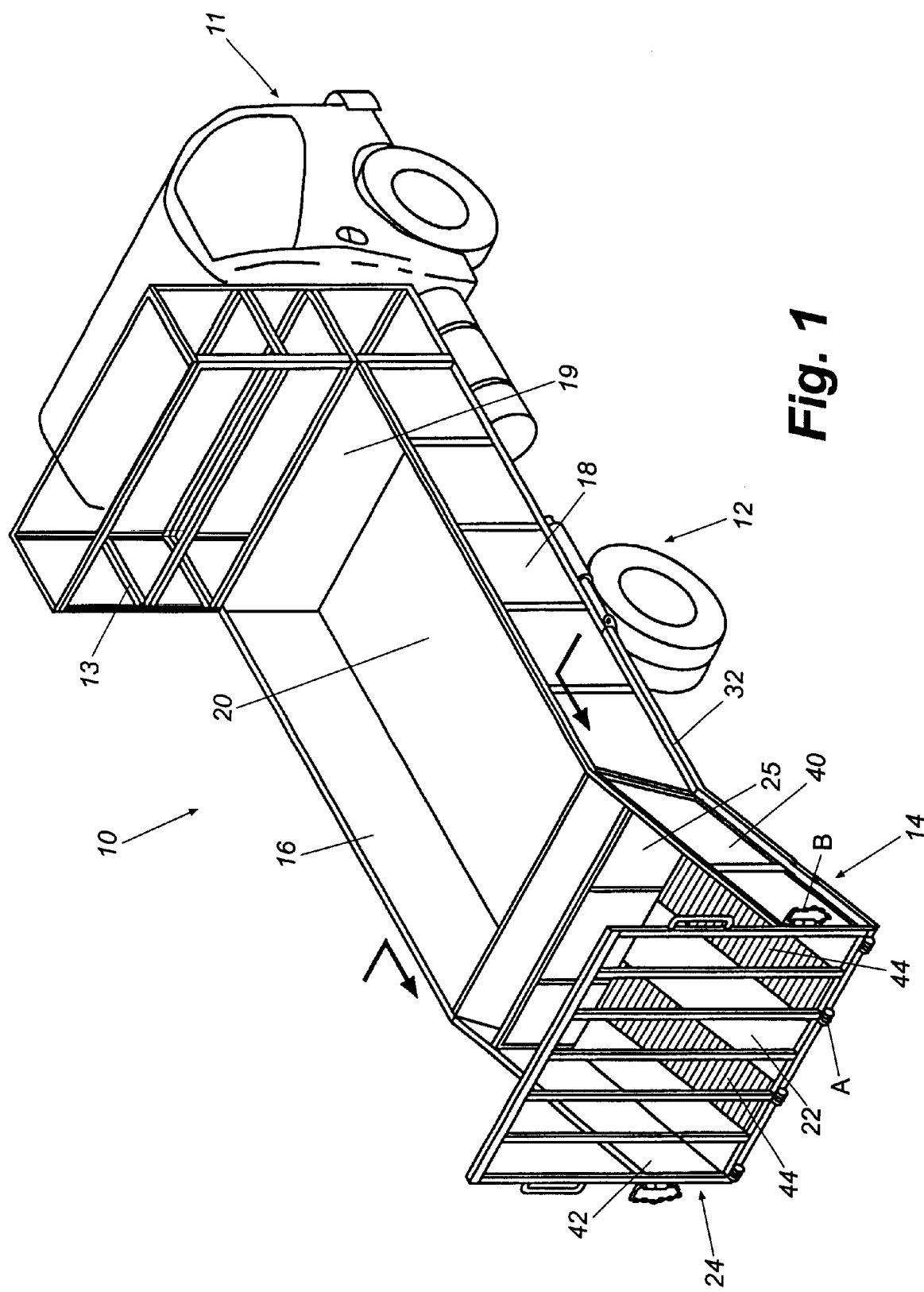
FIG. 1 is a perspective view of a truck that embodies principles of the present invention in one preferred form and shown in its hauling configuration with the ramp assembly in its lowered position.

Reference will now be made in detail to the presently preferred embodiments of the invention, one or more examples of which are illustrated in the drawings. Each example is provided by way of explanation of the invention, and not meant as a limitation of the invention. For example, features illustrated or described as part of one embodiment can be used on another embodiment to yield yet another embodiment. It is intended that the present invention includes such modifications and variations.

Referring now to the drawings, in which like numerals refer to like parts throughout the several views, FIG. 1 illustrates a truck that embodies principles of this invention. The truck 10 has a conventional frame and drive train and includes a cab 11 and a truck bed 12 mounted to the frame behind the cab. The bed 12 has a floor 20 from which side panels 16 and 18 and a front panel 19 upwardly extend. A tool rack 13, which may take on any of a variety of configurations, may be mounted to the truck frame between the cab and the bed for receiving and holding tools such as rakes, shovels, and the like. Alternatively, the rack may be configured with shelves and closeable doors and may be used to carry smaller tools, maintenance gear, and the like.

Figure 2:
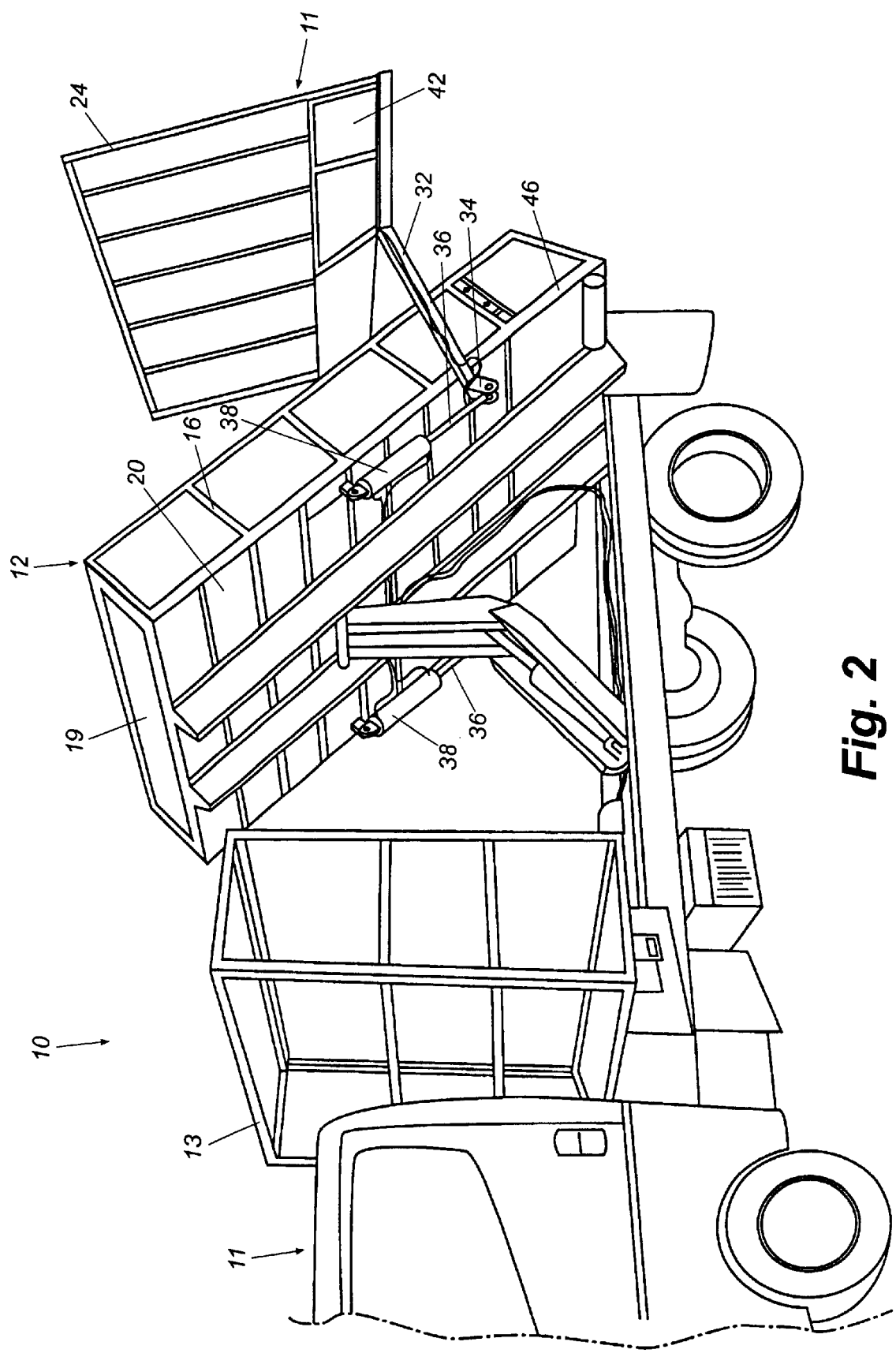
FIG. 2 is a perspective view of the truck of FIG. 1 with the ramp assembly in its raised position and the bed of the truck raised for dumping a load.

As illustrated in FIG. 2, the bed 12 of the truck 10 is mounted to the truck frame in such a way that it can be raised by means of appropriate hydraulic actuators to a raised or dumping position. The mechanism for raising the bed is conventional and well understood by those of skill in the art and thus need not be discussed in detail here.

Ramp assembly, generally indicated at 14, is mounted to the back end portion of the bed 12 on a pair of pivot arms 32 (only one of which is visible in FIG. 1). The ramp assembly includes a ramp deck 22 having forward, rear, and side edges. Side panels 40 and 42 extend upwardly from the side edges of the deck 22 and a tailgate assembly 24 is hingedly mounted to the back edge of the deck. A removable panel 25 preferably is disposed along the forward edge of the ramp deck 22 and extends between the two side panels 40 and 42. When in place as shown in FIG. 1, the removable panel 25 closes the back end of the truck bed 12 to prevent items from sliding out of the bed. When removed, access from the ramp assembly to the bed is provided. As in a conventional landscape truck, the tailgate 42 can be hinged down to its deployed position as illustrated in FIG. 3, wherein the tailgate 42 and ramp deck 22 together form a ramp that extends from the ground upwardly to the bed 12 of the truck. In this configuration, mowers and other heavy equipment can be driven up the ramp and onto the bed of the truck for transport to a job site.

Ramp deck 22 may be provided if desired with surface modifications to provide traction and facilitate the loading and unloading of equipment into the bed of the truck 10. For example, tread plates 44 with transversely extending treads may be installed on ramp deck 22. Other types of friction enhancements such as, for example, serrated surface treatments may also be used, and all such surface modifications should be considered to be within the scope of the invention. It will be clear to those of skill in the art that when the truck 10 is configured as illustrated in FIG. 1, it functions in essentially the same way as a traditional landscape truck for loading, unloading, and transporting equipment and tools to a job site.

FIG. 2 illustrates the truck of this invention configured for use as a dump truck for dumping loads carried within its bed onto the ground. The bed 12 is shown pivoted upwardly about the rear end of the truck frame by the conventional hydraulic lifting mechanism attached to the frame and the bottom of the bed. To allow the bed 12 to be pivoted to this raised position, and to permit the contents of the bed to slide uninhibited out of the bed and onto the ground, the ramp assembly 14 is pivoted upwardly to its raised position located generally above the bed and out of the way. More specifically, when it is desired to raise the bed 12 of the truck to its dumping position, hydraulic cylinders 38 are appropriately actuated to extend their cylinder rods 36 in a rearward direction with respect to the truck bed. The ends of the cylinder rods 36 are connected with a pivot pin to the ends of relatively short pivot blocks 34, which are position on the inside of the lower bed frame beams 46. The other or upper end of each pivot block 34 is welded or otherwise fixed to the interior end of a pivot shaft (not visible in FIG. 2) that extends through appropriate bearings or bushings in the frame beam 46 to an exterior end, which is welded or otherwise attached to the end portion of the corresponding pivot arm 32. With such a configuration, it will be appreciated that the ends of the pivot arms 32 are pivotally mounted to the bed 12 and that movement of the pivots blocks 34 in a rearward direction causes the pivot arms 32 to rotate upwardly about their distal ends. This upward rotation of the pivot arms, in turn, causes the ramp assembly 14, to which the pivot arms are fixed, to move upwardly to its raised position generally overlying the bed 12 of the truck. Thus, when the hydraulic cylinders 38 are actuated to extend their cylinder rods 36, the ramp assembly 14 moves to its raised position, whereupon the bed 12 can be raised to its dumping position for dumping a load without the ramp assembly engaging the ground or blocking the back end of the bed.

While the just described hydraulic mechanism for raising the ramp assembly is preferred and represents the best mode known to the inventor of carrying out the invention, it nevertheless will be understood that a variety of other mechanisms might be substituted with comparable results. For example, a jack screw arrangement might be substituted for the hydraulic cylinder or the hydraulic cylinder may be positioned to act directly on the pivot arm 32 rather than on a pivot block connected to the pivot arm. Any mechanism or means for selectively displacing the ramp assembly from the rear of the bed and out of the way to facilitate dumping is considered to be within the scope of the present invention. However, the illustrated embodiment is preferred for its simplicity and reliability and because the hydraulic cylinders that raise the ramp assembly are disposed out of the way beneath the truck bed, where they are somewhat protected and do not interfere with normal use of the truck.

FIG. 3 illustrates the rear end portion of the truck of this invention with the ramp assembly in its lowered position and tailgate 24 pivoted downwardly to its deployed position to form a ramp from the ground to the bed of the truck. The tailgate 24 is seen to be formed as a welded-together frame of steel bars that preferably are covered with a heavy steel mesh cloth to provide a light yet strong surface that can bear the weight of mowers and other equipment driven or pushed up the ramp. The tailgate 24 is hingedly attached to the rear edge of the ramp deck 22 in any appropriate traditional manner that allows free movement of the tailgate between its stowed and deployed positions. Conventionally, when it is desired to load equipment such as mowers into the bed 12 of the truck, the removable rear panel 25 is slipped upwardly out of its brackets as indicated by the arrows in FIG. 3 and the equipment is driven or pushed up the ramp and into the bed. The removable panel 25 is then replaced in its brackets to block the back of the bed and prevent equipment from rolling or sliding out of the bed accidentally. In this regard, the removable panel 25 also captures loads such as dirt and mulch from spilling out of the bed when the truck is being used to haul such loads. With the equipment loaded, the tailgate is raised and locked in its stowed position (FIG. 1) and can be transported in the usual way to a job site. Of course, the equipment loading procedures are simply reversed for unloading equipment from the truck.

FIG. 4 illustrates a preferred hinge arrangement for hingedly attaching the tailgate 24 to the rear edge 48 of the ramp deck 22, although many types of hinge mechanisms may be substituted within the scope of the invention. The bottom rail 53 of the tailgate 24 is provided with a spaced pair of depending hinge tabs 51, which preferably are welded to the bottom rail. Each of the tabs 51 is provided with a hole and the holes in the tabs are aligned with each other. The rear edge 48 of the ramp deck is provided with a corresponding spaced pair of hinge tabs 50, which project rearwardly from the rear edge 48 and are provided with aligned holes. The spacing between the hinge tabs 50 is slightly larger than the spacing between the hinge tabs 51 such that the hinge tabs 51 fit between the hinge tabs 50 with all of the holes of the hinge tabs aligned with each other. A hinge pin 52 extends through the aligned holes of the hinge tabs to connect the tabs together and to form a hinge about which the tailgate may pivot between its stowed and deployed positions. A torsion spring 23 preferably is provided in a conventional configuration to bias the tailgate toward its stowed position and to bear part of the weight of the tailgate when it is manually raised. Of course any number of hinge assemblies such as that shown in FIG. 4 preferably are provided along the width of the tailgate, four such hinge assemblies being illustrated in FIG. 3.

FIG. 5 illustrates a preferred locking assembly for releasably locking the tailgate in its stowed position for transport. It will be understood that a variety of locking assembly designs might well be substituted for the illustrated assembly within the scope of the invention. In the embodiment of FIG. 5, the side rail 54 of the tailgate 24 is provided with a tubular locking sleeve 47, which preferably is welded to the side rail. The back edge of the side 40 of the ramp deck is provided with a corresponding locking sleeve 28, which preferably also is welded to the back edge. The locking sleeves 28 and 47 are positioned such that they align with each other in end-to-end relationship as shown when the tailgate is raised to its stowed position. A locking pin 26, which preferably is tethered to the side 40 by means of a chain 27 and eye 29, is sized to be inserted through the aligned locking sleeves to lock the tailgate secured in its stowed position. For lowering the tailgate, the locking pins are simply removed by pulling them up out of the locking sleeves, whereupon the tailgate is lowered as described above.

The invention has been described herein in terms of preferred embodiments and methodologies, which represent the best mode known to the inventor of practicing the invention. It will be understood by those of skill in the art, however, that a variety of modifications and substitutions may be within the scope of the present invention.

For example, while the ramp assembly of the present invention has been illustrated as mounted to a truck bed attached to a conventional frame and including a cab, other embodiments are contemplated to be within the scope of the invention. For example, another embodiment comprises a ramp assembly disposed on a bed mounted on a trailer chassis, which can be pulled by a truck or other vehicle.

Although a traditional downwardly sloping ramp deck at the back of the bed has been illustrated and is common, landscape trucks with ramp assemblies that do not slope downwardly from the rear of the bed are also quite common. While the tendency of the ramp assembly to drag the ground when the bed is raised is reduced in such configurations, the ramp assembly still must be moved away from the back of the bed to allow material in the bed to be dumped onto the ground. Accordingly, the invention is equally adaptable to landscape truck designs with non-sloping ramp assemblies.

The words used herein are words of description rather than of limitation. In addition, it should be understood that aspects of the various embodiments may be interchanged both in part and in whole. These and other additions, deletions, and modifications to the illustrated embodiments may well be made by those of skill in the art without departing from the spirit and scope of the invention as set forth in the claims.

What is claimed is:

1. A ramp assembly movably attachable to the rear end of a liftable bed said bed being moveable between a carry position and a dump position, said ramp assembly comprising:
    a ramp deck;
    a pair of arms, each having a first end and a second end, each said first end being pivotably secured to said bed and each said second end being fixed to said ramp deck;
    a tailgate on said ramp deck, said tailgate extending from ramp deck to the ground when said tailgate is in a deployed position; and
    means for pivoting said pair of arms to displace said ramp deck and said tailgate away from the rear end of the bed to permit raising of the bed for dumping of a load carried in the bed.

2. A ramp assembly as defined in claim 1, wherein said means for pivoting said arms comprises at least one hydraulic cylinder.

3. A ramp assembly as defined in claim 1, further comprising a selectively removable panel on said ramp deck, said panel being positioned to prevent a load from spilling out of the bed.

4. A combination load/dump assembly comprising:
    a pivotably liftable bed mounted to a frame, said bed moveable between a carry position and a dump position;
    means for moving said bed between said carry position and said dump position;
    a pair of arms, each having a first end and a second end, each said first end being pivotably secured to said bed and each said second end extending from said bed;
    a rear end, pivotably mounted to said second ends of said pair of arms and moveable between a ramp position and a gate position, said rear end extending from said bed to the ground when said rear end is in said ramp position and when said bed is in said carry position said rear end extending substantially upwardly when said rear end is in said gate position;
    means for lifting said rear end from said bed; and
    means for pivoting said arms to lift said rear end from said bed to permit dumping of said bed by pivotably lifting said bed from said carry position to said dump position.

5. A ramp assembly as defined in claim 4, wherein said means for lifting said rear end and for pivoting said arms comprises a hydraulic cylinder.

6. A ramp assembly as defined in claim 5, wherein said hydraulic cylinder operates at a pressure of from about two thousand pounds per square inch to about four thousand pounds per square inch.

7. A ramp assembly as defined in claim 6, wherein said hydraulic cylinder operates at a pressure of about three thousand two hundred two fifty pounds per square inch.

8. A ramp assembly as defined in claim 4, wherein said ramp assembly further includes a storage assembly, said storage assembly positioned in said bed to receive and store equipment and the like.

9. A ramp assembly as defined in claim 4, further comprising a movable panel, said moveable panel positioned to prevent a load from exiting said bed when truck bed is in said carry position.

10. A ramp assembly as defined in claim 4, wherein said bed ranges from about ten feet in length to about sixteen feet in length.

11. A vehicle comprising:
a frame;
a pivotably liftable bed mounted to said frame, said bed moveable between a carry position and a dump position;
means for lifting said bed;
a ramp and tailgate assembly disposed at a rear end portion of said bed;
a pair of pivot arms extending from said ramp assembly and being pivotally attached to said bed;
a means for pivoting said pivot arms to displace said ramp assembly from said rear end portion of said bed to permit dumping of said bed by lifting said bed from said carry position to said dump position.

12. A vehicle as claimed in claim 11, wherein said means for pivoting said pivot arms comprises a hydraulic cylinder.

13. A vehicle as claimed in claim 11, and further comprising a storage assembly positioned on said frame to receive and store ancillary equipment.

14. A vehicle as claimed in claim 11, further comprising a removable panel on said ramp assembly, said removable panel positioned to prevent a load from exiting said bed when said bed is in said carry position.

15. A ramp assembly for pivotably attaching to a pivotably liftable bed, the bed being moveable between a carry position and a dump position, said ramp assembly comprising:
a pair of arms, each having a first end and a second end, each said first end being pivotally secured to said bed and each said second end extending from said bed;
a ramp deck mounted to said second ends of said arms;
a tailgate on said ramp deck, said tailgate being moveable between a stowed position and a deployed position, said ramp deck and said tailgate forming a ramp extending from said bed to the ground when tailgate is in its deployed position; and
a lifting mechanism for pivoting said arms to displace said ramp deck and said tailgate from said bed to permit dumping of said bed by pivotably lifting said bed from said carry position to said dump position.

16. A ramp assembly as defined in claim 15, wherein said lifting device is a hydraulic cylinder.

17. A truck comprising:
a frame;
a cab;
a bed mounted to said frame behind said cab, said bed having a rear end portion and being selectively movable between a lowered hauling position and a raised dumping position;
a lifting mechanism for moving said bed between its hauling and dumping positions;
a ramp assembly mounted to said bed and disposed at said rear end portion of said bed, said ramp assembly being selectively movable between a lowered position, wherein said ramp assembly is substantially contiguous with said rear end portion of said bed for loading items into said bed, and a raised position, wherein said ramp assembly is displaced from said rear end portion of said bed to allow said bed to be raised to its dumping position for dumping a load out of said bed; and
a raising mechanism for moving said ramp assembly between its lowered and its raised positions.

18. A truck as claimed in claim 17 and wherein said ramp assembly includes a ramp deck that slopes downwardly from said rear end portion of said bed toward the ground when said ramp assembly is in its lowered position.

19. A truck as claimed in claim 18 and wherein said ramp assembly further comprises a tailgate hingedly secured to said ramp deck, said tailgate being movable between a stowed position extending generally upwardly from said ramp deck and a deployed position extending rearwardly from said ramp deck to the ground, said tailgate and said ramp deck forming a continuous ramp from the ground to said bed of said truck when said tailgate is in its deployed position.

20. A truck comprising a frame, a cab, a bed having a rear end portion, and a ramp and tailgate assembly disposed at said rear end portion of said bed and being deployable to form a ramp contiguous between said rear end and the ground for loading items into said bed, said ramp assembly being selectively displaceable from said rear end portion of said bed to facilitate the dumping of loads from said bed.

21. A truck as claimed in claim 20 and further comprising pivot arms projecting from said ramp assembly to distal ends, said pivot arms being rotatably attached adjacent their distal ends to said bed, said ramp assembly being displaced from said rear end portion of said bed upon rotation of said pivot arms about their attachment to said bed.

22. A truck as claimed in claim 21 and further comprising actuators for selectively rotating said pivot arms to displace said ramp assembly.

23. A truck as claimed in claim 22 and wherein said actuators comprise hydraulic cylinders.

24. As truck as claimed in claim 22 and further comprising a pivot shaft fixed at one end to said distal end of each of said pivot arms and extending through a frame member of said bed to another end, and a pivot block attached to the other end of each of said pivot shafts, rotation of said pivot blocks being transmitted through said pivot shafts to cause said pivot arms to rotate and displace said ramp assembly, said actuator being coupled to said pivot blocks.

25. A ramp assembly movably attachable to the rear end of a liftable bed, said bed being moveable between a carry position and a dump position, said ramp assembly comprising:
a ramp deck;
at least one arm, having a first end and a second end, each said first end being pivotably secured to said bed and each said second end being fixed to said ramp deck;
a tailgate on said ramp deck, said tailgate extending from ramp deck to the ground when said tailgate is in a deployed position; and
means for pivoting said arm to displace said ramp deck and said tailgate away from the rear end of the bed to permit raising of the bed for dumping of a load carried in the bed.

* * * * *